United States Patent
Maietta

[19]
[11] Patent Number: 6,061,094
[45] Date of Patent: May 9, 2000

[54] METHOD AND APPARATUS FOR SCALING AND REDUCING FLICKER WITH DYNAMIC COEFFICIENT WEIGHTING

[75] Inventor: Michael Maietta, San Jose, Calif.

[73] Assignee: U.S. Philips Corporation, New York, N.Y.

[21] Appl. No.: 08/968,372

[22] Filed: Nov. 12, 1997

[51] Int. Cl.[7] .................................................. H04N 7/01
[52] U.S. Cl. ........................ 348/446; 348/447; 348/910
[58] Field of Search ..................................... 348/441, 581, 348/453, 445, 444, 457, 454, 446, 910; H04N 7/01

[56] References Cited

U.S. PATENT DOCUMENTS

| | | |
|---|---|---|
| 5,510,843 | 4/1996 | Keene et al. . |
| 5,534,936 | 7/1996 | Kim . |
| 5,572,259 | 11/1996 | Nohara . |
| 5,646,696 | 7/1997 | Sprague ............................ 348/458 |
| 5,905,536 | 5/1999 | Morton et al. ...................... 348/453 |

FOREIGN PATENT DOCUMENTS

| | | | |
|---|---|---|---|
| 0372774 | 6/1990 | European Pat. Off. | ......... H04N 5/44 |
| 0575862A1 | 12/1993 | European Pat. Off. | ......... H04N 5/44 |
| 0751682A2 | 1/1997 | European Pat. Off. | ......... H04N 5/44 |
| WO 9714247 | 4/1997 | WIPO | ......... H04N 5/44 |

*Primary Examiner*—Michael H. Lee

[57] ABSTRACT

A method and apparatus is provided for the conversion of non-interlaced image data to interlaced image data while reducing flicker effects and simultaneously scaling the image data. A programmable discrete time oscillator (DTO) dynamically determines coefficients that are used in reducing flicker and vertical and horizontal scaling. The two functions are integrated which allow the flicker filter coefficient generated by the DTO to dynamically be modified and take into account desired vertical scaling. A similar DTO is provided to separately perform horizontal scaling using the dynamic coefficients.

16 Claims, 8 Drawing Sheets

| | | A | B | C | D | E | F | G |
|---|---|---|---|---|---|---|---|---|
| | ANTI-FLICKER EXAMPLE WITH 1-2-1 | | | | | | | |
| REFERENCE NO. | | | | | | | | |
| 1 | REG. EWBYII (SKIP VALUE) = | 1 | | 0 | 0 | | | |
| 2 | REG. EWBYIA (INCREMENT VALUE) = | 0 | | 0.5 | (1/2) | | | |
| 3 | REG. EWBYIO (FIRST LINE WEIGHTING) = | 0 | | 0.75 | (3/4) | | | |
| 4 | RGB PIXEL NUMBER: | 1 | 2 | 3 | 4 | 5 | 6 | 7 |
| 5 | TEST POINT NO. | | | | | | | |
| 6 | ADDER (7) - DTO VALUE | (3/4) | 0.25 | 0.75 | 0.25 | (5/6) | 0.5 | (5/6) |
| 7 | ADDER CARRY (7) | 0 | 1 | 0 | 1 | 0 | 1 | 0 |
| 8 | DTO REG (8) | 0 | (3/4) | (1/4) | (3/4) | (1/4) | (3/4) | (1/4) |
| 9 | MUX OUTPUT (9) | 0 | 0.25 | 0.75 | 0.25 | 0.75 | 0.5 | 0.75 |
| 10 | DTO WEIGHT (10) | (3/4) | (1/4) | (1/2) | (1/4) | (1/2) | (1/4) | (1/2) |
| 11 | DTO WEIGHT (11) | N/A | (1/4) | N/A | (1/4) | N/A | (1/4) | N/A |
| 12 | MULTIPLIER (10) | (3/4)*RGBi | (1/4)*RGBi | (1/2)*RGBi | (1/4)*RGBi | (1/2)*RGBi | (1/4)*RGBi | (1/2)*RGBi |
| 13 | MULTIPLIER (11) | N/A | (1/4)*RGBi | N/A | (1/4)*RGBi | N/A | (1/4)*RGBi | N/A |
| 14 | OUTPUT REG. VALUE (16) | N/U | (3/4)p1 + (1/4)p2 | N/U | (1/4)p2 + (1/2)p3 + (1/4)p4 | N/U | (1/4)p4 + (1/2)p5 + (1/4)p6 | N/U |

FIG. 6a

| | ANTI-FLICKER EXAMPLE WITH 1-4-1 | | | | | | | |
|---|---|---|---|---|---|---|---|---|
| 15 | REG. EWBYI (SKIP VALUE) = | | | 0.33 | | | | |
| 16 | REG. EWBYA (INCREMENT VALUE) = | | | 0.67 | | | | |
| 17 | REG. EWBYIO (FIRST LINE WEIGHTING) = | | | 0.83 | | | | |
| 18 | RGB PIXEL NUMBER: | 1 | 2 | 3 | 4 | 5 | 6 | 7 |
| 19 | TEST POINT NO. | | | | | | | |
| 20 | ADDER (7) - DTO VALUE | (5/6) | 0.5 | (5/6) | 0.5 | (5/6) | 0.5 | (5/6) |
| 21 | ADDER CARRY (7) | 0 | 1 | 0 | 1 | 0 | 1 | 0 |
| 22 | DTO REG (8) | 0 | (5/6) | (1/6) | (5/6) | (1/6) | (5/6) | (1/6) |
| 23 | MUX OUTPUT (9) | 0 | 0.1667 | (5/6) | 0.1667 | (5/6) | 0.1667 | (5/6) |
| 24 | DTO WEIGHT (10) | (5/6) | (1/6) | (1/6) | (1/6) | (2/3) | (1/6) | (2/3) |
| 25 | DTO WEIGHT (11) | N/A | N/A | N/A | N/A | N/A | N/A | N/A |
| 26 | MULTIPLIER (10) | (5/6)*RGBi | (1/6)*RGBi | (2/3)*RGBi | (1/6)*RGBi | (2.3)*RGBi | (1/6)*RGBi | |
| 27 | MULTIPLIER (11) | N/A | (1/6)*RGBi | N/A | (1/6)*RGBi | N/A | (1/6)*RGBi | |
| 28 | OUTPUT REG. VALUE (16) | N/U | (5/6)p1 + (1/6)p2 | N/U | (1/6)p2 + (2/3)p3 + (1/6)p4 | N/U | (1/6)p4 + (2.3)p5 + (1/6)p6 | N/U |

FIG. 6b

| | ANTI-FLICKER EXAMPLE WITH 1-6-1 | | | | | | |
|---|---|---|---|---|---|---|---|
| 29 | REG. EMBYII (SKIP VALUE) = | | | 0.5 | | | |
| 30 | REG. EMBYIA (INCREMENT VALUE) = | | | 0.75 | (3/4) | | |
| 31 | REG. EMBYIO (FIRST LINE WEIGHTING) = | | | 0.875 | (7/8) | | |
| 32 | RGB PIXEL NUMBER: | 1 | 2 | 3 | 4 | 5 | 6 | 7 |
| 33 | TEST POINT NO. | | | | | | | |
| 34 | ADDER (7) - DTO VALUE | (7/8) | 0.625 | 0.875 | 0.625 | (5/6) | 0.5 | (5/6) |
| 35 | ADDER CARRY (7) | 0 | 1 | 0 | 1 | 0 | 1 | 0 |
| 36 | DTO REG (8) | 0 | (7/8) | (1/8) | (7/8) | (1/8) | (7/8) | (1/8) |
| 37 | MUX OUTPUT (9) | 0 | 0.125 | 0.875 | 0.125 | 0.875 | 0.125 | 0.875 |
| 38 | DTO WEIGHT (10) | (7/8) | (1/8) | (3/4) | (1/8) | (3/4) | (1/8) | (3/4) |
| 39 | DTO WEIGHT (11) | N/A | (1/8) | N/A | (1/8) | N/A | (1/8) | N/A |
| 40 | MULTIPLIER (10) | (7/8)*RGBi | (1/8)*RGBi | (3/4)*RGBi | (1/8)*RGBi | (3/4)*RGBi | (1/8)*RGBi | (3/4)*RGBi |
| 41 | MULTIPLIER (11) | N/A | (1/8)*RGBi | N/A | (1/8)*RGBi | N/A | (1/8)*RGBi | |
| 42 | OUTPUT REG. VALUE (16) | N/U | (7/8)p1 + (1/8)p2 | N/U | (1/8)p2 + (3/4)p3 + (1/8)p4 | N/U | (1/8)p4 + (3/4)p5 + (1/8)p6 | N/U |

FIG. 6c

N/A = NOT APPLICABLE
N/U = VALUE NOT USED

METHOD AND APPARATUS FOR SCALING AND REDUCING FLICKER WITH DYNAMIC COEFFICIENT WEIGHTING

FIELD OF THE INVENTION

The present invention relates generally to visual data conversion, and more particularly to a visual data converter that reduces flicker and scales images using dynamic coefficients when converting visual data for display on an interlaced monitor.

BACKGROUND OF THE INVENTION

Many modern video display devices fall into one of two categories—non interlaced or interlaced monitors. An example of each is a computer monitor and a television monitor, respectively. Television monitors are designed for use with broadcast or recorded television signals. The transmission standards for broadcast television signals have been set for decades and include NTSC in the United States and Japan, PAL in much of Europe, and SECAM in France. Analog video tape recording equipment is usually designed to follow one of these standards as well and is sold in each country to conform to the local standard. Other television equipment, such as cameras or camcorders, can be found for use with each of these standards. These transmission standards are well known in the industry and to one skilled in the art. Although each standard differs from the others in terms of number of lines displayed, operating frequencies, and other details, each of these standards shares certain characteristics. For purposes of discussion, the following disclosure will refer to certain specific frequencies and other characteristics of a television standard in terms of NTSC standard values. One skilled in the art will recognize that corresponding values pertain to other television standards and can apply the principles disclosed here to understand the teachings of this invention. Also, transfer of a video signal to a television monitor will be discussed as a transmission, but this transmission might be broadcast or might be transferred through a wired connection.

A single frame of a television video image comprises two fields, each field including a series of scan lines. Referring to FIG. 1a, a frame 5 includes sequential scan lines 1, 2, 3, 4, . . . 524, 525. The specific number of scan lines, here 525, depends on the specific television standard, here the NTSC standard. As depicted in FIG. 1b, frame 5 comprises two fields, odd field 7 and even field 8. Odd field 7 is displayed to a TV screen as a series of scan lines, odd lines 1, 3, 5, . . . , then even field 8 is displayed to the TV screen as a series of even scan lines 2, 4, 6, . . . interlaced between the odd scan lines. According to the NTSC standard, each field is written in $\frac{1}{60}^{th}$ of a second for a total time of $\frac{1}{30}^{th}$ of a second to display each frame 5. The NTSC standard also specifies how long each scan line may be and some of the electrical characteristics of the signal and of the display. In a conventional television, the signal along each scan line is continuously changing. A television video signal may be recorded on magnetic tape as an analog signal including information about each scan line of each field.

The advent of the digital computer brought about widespread use of computer monitors. Early computers, especially for home use, relied exclusively on television monitors for output, but as computers became more powerful, it became possible to use a much higher-quality display device—a computer monitor. A computer monitor, while in some ways very like a conventional television monitor, has control electronics that are generally much more precise than those found in a conventional television monitor. The computer monitor can position the electron beam much more precisely and so allows for continuous, sequential scanning of the entire frame, line by line, without interlacing. Each line consists of a number of discrete pixels (picture elements). A video image is stored in a computer as a series of digital bytes. Depending on the capabilities of a particular computer or display, this may include only a single bit of information for each pixel (allowing for two colors, typically black or white) or for more powerful systems many bits of information for each pixel. A typical high quality monitor can display 32 bits of information for each pixel.

A number of array patterns for computer displays have become standard in the industry. One particularly common size is 640×480 pixels (the VGA standard is this size, and many computers support VGA and non-VGA monitors with this display resolution). Other common sizes include 320× 240 (currently generally considered only for low resolution or small image sizes, e.g. one quarter of a 640×480 image), 832×624, 1024×768 and many others. For convenience, the following discussion will refer to 640×480 in certain examples but the principles and teachings of this invention pertain to other resolutions as well.

The increasing use of computers has led to the desire to use a standard television to display a computer-generated or computer-processed image. This is particularly true for computer game players, who desire to play their games on a television. In addition to gaming, computers are used for information processing such as multimedia CDs and communication over the Internet which also leads to the desire to view the images on a television. However, a television monitor suffers from several disadvantages when used to display computer images. Two very significant problems are overscan and flicker.

A typical television transmission is designed to overscan the available display space, so some information is expected to be lost along at least some edges. Where a computer menu or other information is displayed along an edge, typically the top but sometimes the bottom or a left or right edge, loss of even a small portion of the information can make it difficult or impossible to use the computer.

Although a typical NTSC signal includes 525 scan lines for each frame, only about 480 of these are shown in a typical display. Some of the remaining lines are part of the vertical blanking interval, which is provided to allow time for the scanning electronics to reset from the extreme low corner of the screen to the opposite, high corner and to allow time to synchronize certain special portions of the television transmission signal. Most of the remaining lines, however, are not displayed because of deliberate overscan.

There are reasons why a conventional television is designed with overscan. Televisions vary in many ways, including physical scan capabilities, accuracy, curvature, mask or bezel position, manufacturing and component tolerances and component aging. To compensate for this variation, a typical television transmission includes more vertical scan lines or information than can be displayed on a typical television. In addition, a typical transmission includes longer scan lines than can be displayed. The resulting visible image displayed is approximately 90% of the transmitted image. The result is that for almost all televisions, some information on each edge is discarded (not displayed) but for almost no televisions is there a blank portion along any edge. However, if a top portion of a transmitted image is in the overscan region, it may not be displayed at all.

Flicker can be a significant problem as well. In general, images updated less than 40 times a second on a display have noticeable flicker. Studies have shown that flicker is not noticed by most people if the images are updated faster than 60 times a second (refresh rate of 60-Hz). In interlaced scanning, first all odd lines are scanned from top to bottom, and the even lines are skipped. After the vertical retrace, all the even lines in the first scan are then scanned from top to bottom. Under NTSC standards, the vertical refresh rate of each field is 60-Hz, resulting in a frame refresh rate of 30-Hz. It is important to note that each scan line is updated at a refresh rate of 30-Hz. Under PAL and SECAM standards, the corresponding values are even slower: 50-Hz and 25-Hz.

In addition, images with high vertical contrast tend to flicker noticeably when displayed on interlaced television. An example of this would be a narrow horizontal line, often found in a table of numbers. If the line to be displayed happens to fall just along one scan line on the television, then it will flash on only once every $30^{th}$ of a second. If that same line was just a bit wider and so fell along an odd scan line and an adjacent even scan line, each line would be displayed alternately so the resulting line would be displayed every $60^{th}$ of a second (but moving up and down slightly).

Most natural images (scenery, people etc.) do not have a sharp vertical contrast, i.e. there is not much difference in intensity between adjacent horizontal lines. This results in an apparent refresh rate of 60-Hz for the TV thereby causing minimal flicker. However, computer generated graphics can have a large intensity vertical contrast (e.g., a single pixel black horizontal line on a white background). Since each line is updated at refresh rate of 30-Hz, the line would flicker noticeably.

Overall, these disadvantages generally are not significant in traditional broadcast television. In a traditional television image, a typical source is some natural scene as captured by a camera. With regard to overscan, if some of the edges are not seen, this is simply perceived as a field-of-view issue, comparable to zooming in or out slightly. With regard to flicker, an object of high vertical contrast, such as a table top, is rarely only one scan wide. Certain natural objects do contain very fine lines, sometimes found on clothing or perhaps in a fence. Accordingly, television newscasters avoid clothing with plaids or narrow horizontal stripes because the resulting transmission can result in a striking flicker effect.

Several techniques are used today to address the overscan problem when displaying computer images on televisions, but none of these techniques solve all of the problems. Convolution has been used in the past to change the size of an image. Convolution has also been used to convert between interlaced and non-interlaced images. Various convolution schemes used historically are not useful in this instance because they are either too expensive or not sufficiently powerful. Existing solutions include:

1) Recreate content: One simple approach is to recreate content or images that are less than the relevant computer image size, for example 640×480 pixels. This however, requires considerable work and many, if not all, computer programs would have to be rewritten. For computer titles that may be used on either a computer or television display, this would require different versions of the program, which inevitably causes problems including sales and inventory management difficulties and consumers being forced to choose one or the other when they might want both.

2) Image reduction by pixel/line dropping: This simple technique drops one pixel out of 'n' pixels and/or one line out of 'n' lines to scale an image. For example, to scale the image by 2/3 1 out of 3 pixels are dropped. Unfortunately, this simplistic algorithm does not yield high quality images. A one-pixel-wide horizontal or vertical line in the source image inadvertently may be omitted entirely in the output image if this technique is used.

3) Bi-linear interpolation: This technique uses the weighted average between the two nearest pixels to create an output pixel. This is a cost effective technique resulting in generally good quality images.

4) Multiple tap finite impulse response (FIR) filters: This technique uses multiple tap (up to 65 tap) filters for horizontal and vertical resizing. This results in very good image quality but needs complicated and expensive hardware.

The problem of flicker has been addressed with some limited success by earlier image display schemes. However, none of these schemes can provide the high quality image that consumers now expect when viewing computer images. Existing solutions include:

1) Display only one field: This technique displays only one field of the frame at 60-Hz (the other field is not scanned and is black). However the resulting image is of much lower resolution as every other line is missing (black).

2) Three line convolution: This technique reduces flicker by reducing the contrast between horizontal lines by averaging three adjacent vertical pixels. Typically for interlaced line 'p' the new pixel intensity 'n' is given by:

$$n=(\tfrac{1}{4})^{*}(p-1)+(\tfrac{1}{2})^{*}(p)+(\tfrac{1}{4})^{*}(p+1)$$

where (p−1) is the line above and (p+1) is the line below the line being convolved. This technique is quite effective and reduces flicker to an acceptable level. Note that calculation of the first odd-field scan line is a special case combining only two lines.

3) Two line convolution: This technique reduces flicker by reducing the contrast between two horizontal lines by averaging two adjacent vertical pixels (see FIG. 4). Typically, for interlaced line 'p' the new pixel intensity 'n' is given by:

$$n=(\tfrac{1}{2})^{*}p+(\tfrac{1}{2})^{*}(p+1)$$

This technique is not as effective as the three line convolution.

More importantly, these anti-flicker solutions have not been found satisfactory when having to adjust the weighting coefficients used to alter the pixel intensity. However, the shortfalls of the solutions mentioned above have made flicker reduction circuitry and/or software a necessity. This is particularly true because of the increased use of personal computers (PCs) in the creation of video content in the home and office, coupled with the common practice of previewing the created video content on a television. To achieve good quality flicker reduction, which typically involves three or more scan lines, and image scaling, so that the image can be displayed completely on the television screen, costly equipment is required.

SUMMARY OF THE INVENTION

There is a need for fast, efficient, and relatively inexpensive way to flexibly convert non-interlaced images for display on interlaced displays. The present invention satisfies these and other needs by providing flicker reduction of computer-generated text and graphics as well as vertical and horizontal scaling. A programmable discrete time oscillator (DTO) is employed to dynamically determine the coefficients that will be used to reduce flicker and to perform the necessary vertical and horizontal scaling. The programmable DTO allows the flicker filter coefficient generated by the DTO to be dynamically modified to take into account vertical scaling factors, and the programmable DTO generating horizontal scaling factors can be dynamically modified as well.

Generally, three line integration of adjacent lines in the vertical direction (pixel by pixel) and three pixel integration in the horizontal direction are provided. However, more vertical lines or horizontal pixels are integrated as needed depending on settings of the programmable DTO. The programmable DTO is used to determine the coefficients which are used as weighting values which integrate the scan lines or pixels. The ability to easily alter the weighting coefficients to affect flicker reduction, and/or scaling provides a simplified way in which to generate an interlaced image from non-interlaced data in a flexible manner.

Other features and advantages of the invention will be set forth in, or apparent from, the description of the preferred embodiments below.

BRIEF DESCRIPTION OF THE DRAWINGS

FIG. 6 is a table of exemplary values contained in components of the present invention during different times throughout the data conversion.

DESCRIPTION OF THE PREFERRED EMBODIMENTS

Figure 1A:
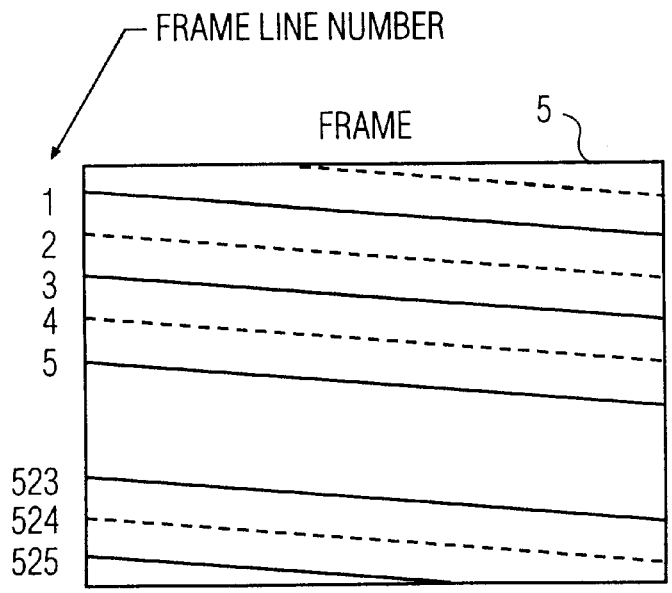
FIGS. 1a and 1b illustrate a frame of non-interlaced display, and a pair of fields of an interlaced display, respectively.
Figure 1B:
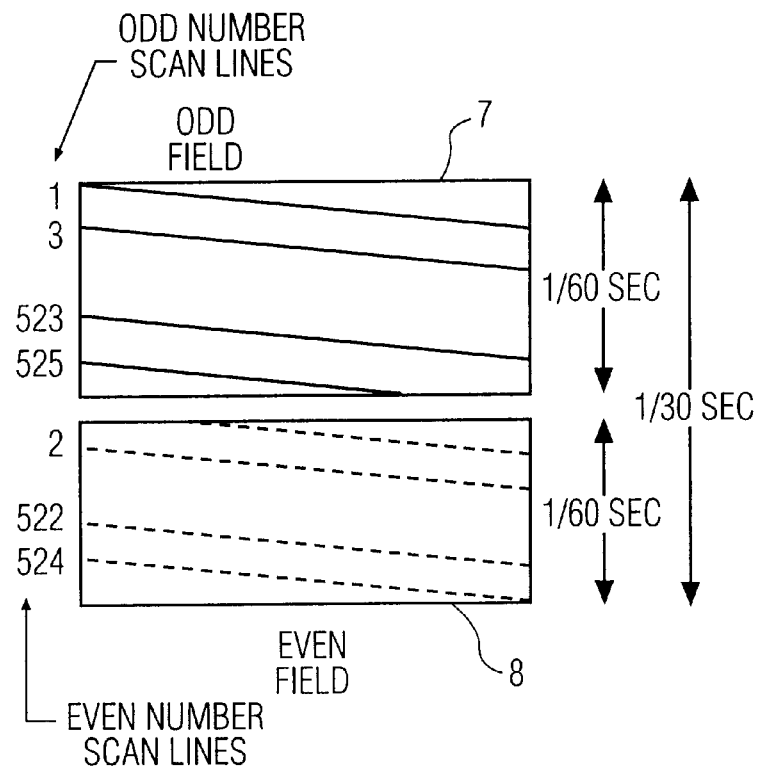

FIG. 1a depicts a frame 5 of non-interlaced visual image data. This data typically takes the form of picture elements (pixels) that are sequentially scanned across frame 5 according to frame line numbers shown in the figure. When frame 5 is converted from non-interlaced format to interlaced format, a pair of fields are generated, an odd field 7 and an even field 8, which split the frame shown in FIG. 1 a into two fields, one with odd number scan lines and the other with even number scan lines, as shown in FIG. 1b.

Figure 2:
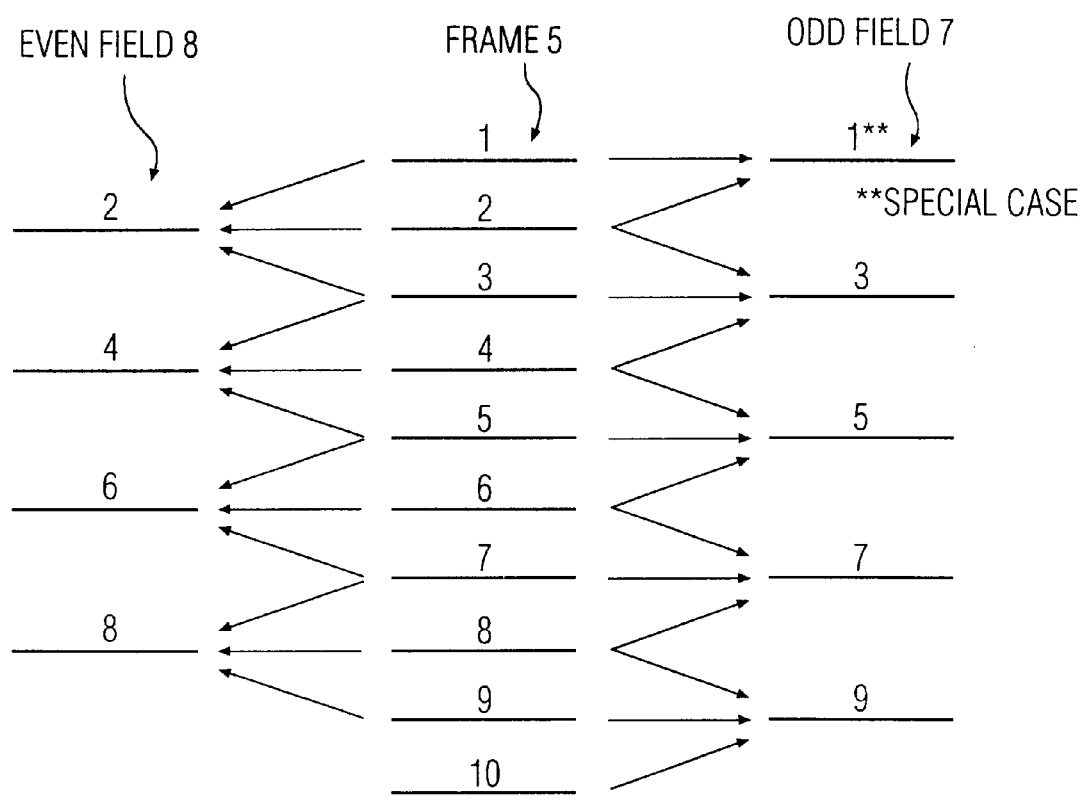
FIG. 2 illustrates conversion from a non-interlaced display to an interlaced display using dynamic coefficients generated by the converter of present invention.

FIG. 2 schematically depicts conversion from non-interlaced format to interlaced format. In the example of FIG. 2, only the first two scan lines from frame 5 are combined in order to generate the first odd field scan line. This is a special case, because in this example typically three lines are combined to form a corresponding interlaced field line, as indicated by the remaining field lines. The special treatment of the first odd scan line stems from the fact that there is no preceding scan line, only a succeeding scan line, with which to combine. The arrows leading from frame 5 to either odd field 7, or even field 8, indicate the transfer of some information from the lines of frame 5 to form a combination that results in a single line in a particular odd or even field. Typically, this transfer of scan line data is achieved according to a weighting coefficient which designates a specific weight or portion for each pixel of one entire scan line which is to be combined with at least one other pixel of the pixels of preceding and/or succeeding scan lines. This combination or conversion technique reduces flicker effects when applied line-by-line to frame 5. By adjusting the weighting coefficients appropriately, vertical scaling can also be accomplished. A similar conversion technique is applied, pixel by pixel, to pixels that are adjacent to one another in a horizontal direction to achieve horizontal scaling of the original image displayed in frame 5. The first pixel of the odd field receives special treatment because there is no preceding pixel with which to calculate the combination.

Figure 3:
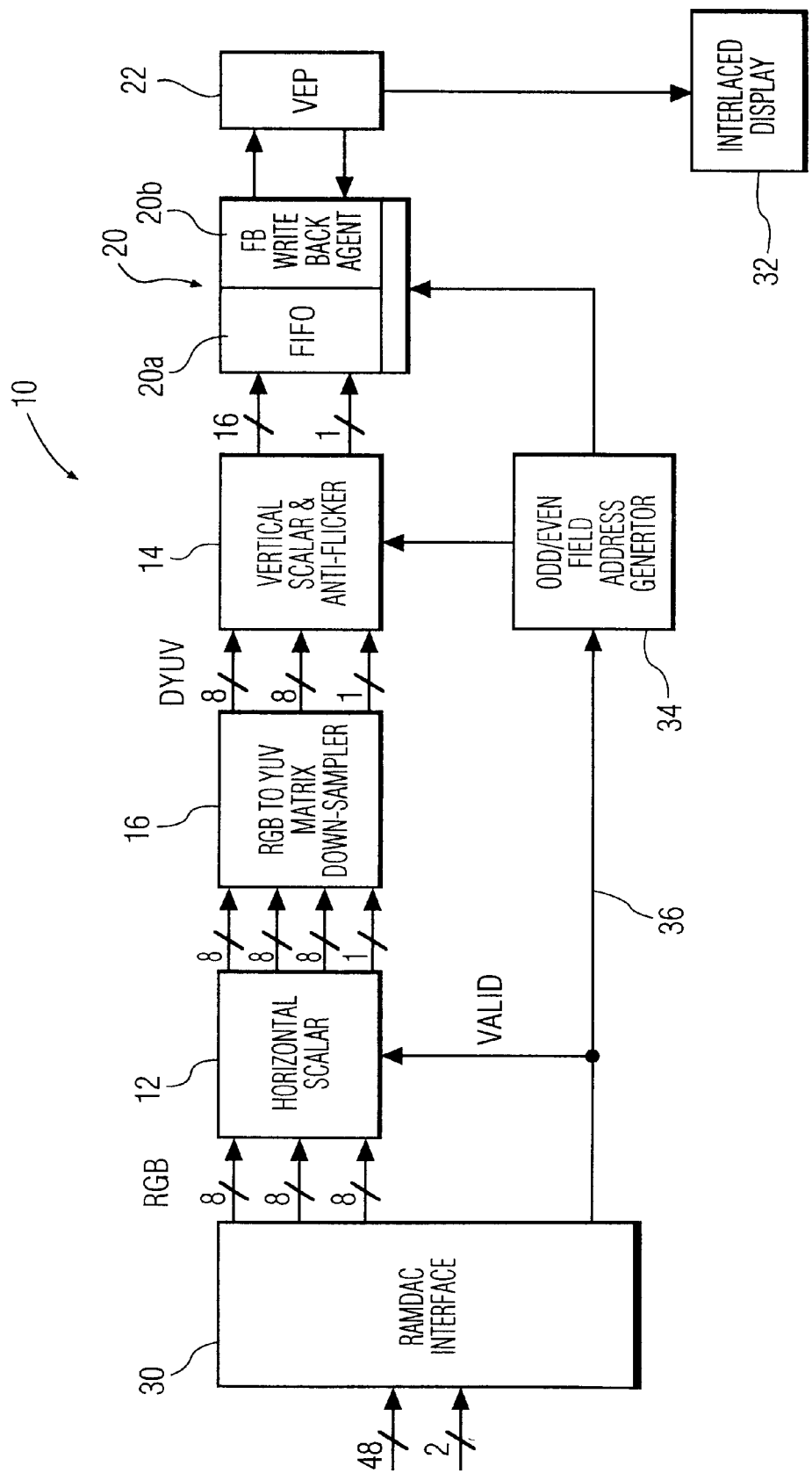
FIG. 3 is a block diagram of a converter system constructed in accordance with an embodiment of the present invention.

FIG. 3 is a block diagram of a visual display data converter 10 according to an embodiment of the present invention. The data converter 10 includes a horizontal scalar 12 and a vertical scalar and anti-flicker component 14. The converter 10 is able to run at least a 50 MHz clock to support an input resolution of at least 800×600 pixels. The converter 10 includes a discontinuous data stream having a valid flag downstream from horizontal scalar 12. An RGB to YUV matrix down sampler 16 is connected between horizontal scalar 12 and vertical scalar and anti-flicker component 14. In other embodiments, however, matrix down sampler 16 is positioned upstream of horizontal scalar 12, or downstream of vertical scalar and anti-flicker component 14, as long as the conversion from RGB to YUV is performed before the data is stored in a FIFO memory 20a and a frame buffer (FB) write back agent 20b, also referred together as component 20.

The write back agent portion of 20b implements a transfer protocol to the frame buffer of 20b portion at approximately 27 MB/sec. For this purpose, the FIFO memory 20a of component 20 is thirty-two words in length in exemplary embodiments. Component 20 allows a video encoder pipe 22 to read the appropriately scaled and flicker reduced data and convert the data into a composite video signal that is output to an interlaced display monitor 32. In order to properly address the interlaced data for the display 32, an odd/even field address generator 34 is connected to the vertical scalar and anti-flicker component 14. This connection allows the generator 34 to write the scaled fields to different memory locations at the appropriate time after receiving synchronizing input 36.

In performing its data conversion process, converter 10 receives RGB data (red, green, and blue) in three 8 bit streams from a Random Access Memory Digital to Analog Converter (RAMDAC) interface 30. The RAMDAC interface 30 receives a 48-bit feedback data stream from another component in the system within which converter 10 is implemented. The RAMDAC interface 30 multiplexes the 48-bit feedback data stream into three 8-bit data streams where each 8-bit data stream corresponds to red, green, and blue data (RGB), respectively. The RAMDAC interface 30 also compensates for any synchronization delays experienced, and changes the synchronization polarity to always be positive. The horizontal scalar 12 receives RGB data from RAMDAC 30 and sends each of the 8-bit data streams through three identical path sections, where each identical data path section will be described below.

Figure 4:
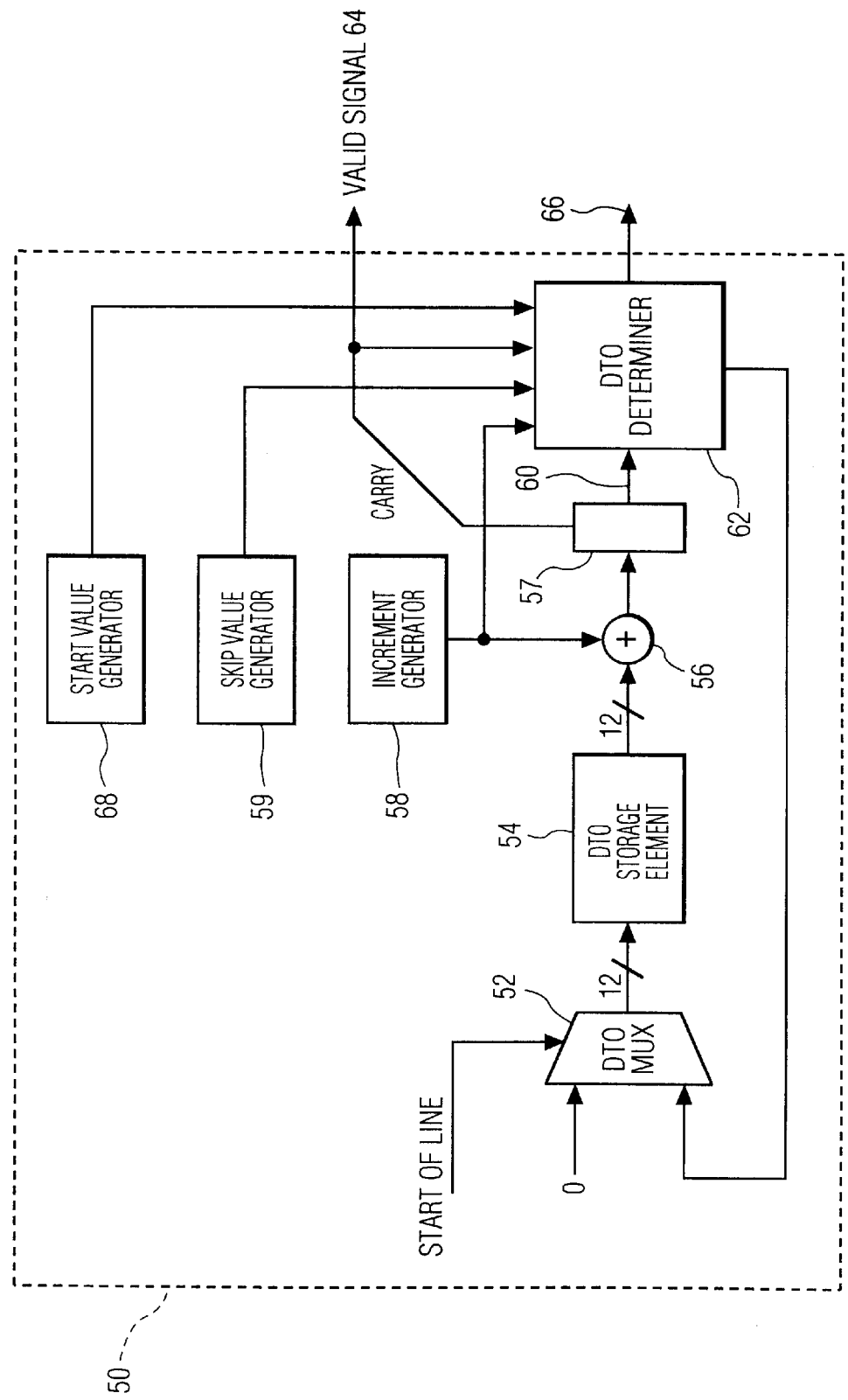
FIG. 4 is a block diagram of a discrete time oscillator in accordance with an embodiment of the present invention.

FIG. 4 is a block diagram of a discrete time oscillator (DTO) 50 constructed in accordance with an embodiment of the present invention. The DTO 50 creates dynamic coefficients which are used in both the horizontal scaling operation performed by horizontal scalar 12, and the vertical scaling and anti-flickering operations performed by vertical scalar and anti-flicker component 14. The DTO 50 can be implemented within each components 12, 14 of FIG. 3, or be implemented as a separate, discrete component. The dynamic coefficients created by DTO 50 are values that are multiplied by incoming pixel data, such as RGB or YUV data, in order to achieve the desired scaling and/or flicker reduction qualities.

Since the operation of the DTO 50 is very similar when applied to pixels coming into horizontal scalar 12, or to scan lines of pixels coming into vertical scalar and anti-flicker component 14, only the operation of one will be described in detail. For the sake of convenience, the operation of the DTO 50 is described in conjunction with the flicker reduction and scaling operations performed by the vertical scalar and anti-flicker component 14 because both are achieved by adjusting the dynamic coefficients.

Scan lines of an image to be converted for display by converter 10 to an interlaced monitor format are processed through the DTO 50 located in the component 14. The DTO 50 comprises a MUX 52 that passes the scan lines of data into a DTO storage element 54, for example, a line store register for storing an entire line of pixel data of the image, enabling the entire line to be addressed simultaneously when compensating for flicker effects. The DTO storage element 54 may also be a single register when used in conjunction with horizontal scalar 12 since individual pixels are addressed. The DTO storage element 54 forwards its contents at the appropriate clock signal to an adder 56. An increment value (INC) is output from increment generator 58 to adder 56 which adds to INC the contents of the DTO storage element 54.

The increment value (INC) is defined by equation 1 below:

$$INC = (\text{output lines/input lines}) \times ((WGT+NWGT)/WGT) \quad (EQ.\ 1)$$

The number of output lines is determined by the number of lines the interlaced monitor can display, taking into account overscan. The number of output lines are usually set to less than the number of input lines. This will allow the image to be scaled so that it can be seen entirely on a television CRT. The overscanned area will be filled with a color, which is set by the TV video encoder 22. The value of INC can be adjusted by altering the output lines value to provide for overscan or underscan, and to effect vertical scaling. The number of input lines is determined by the number of lines originally generated for display on a non-interlaced monitor. The value of WGT equals the weighted area, and NWGT equals the non-weighted area; these two values allow additional scaling to be achieved beyond that accomplished for example when reducing the flicker effects.

Typically, three line (or pixel) scaling/weighting is identified by a series of three numbers. For example, a 121 weighting represents the ratio of coefficients to be multiplied by each pixel in a scan line above and a scan line below a particular scan line. The center coefficient, 2 in this case, represents the coefficient associated with the particular scan line of interest while the 1's are associated with the scan links above and below. In this example there is no gap between the lines of data, and so the weighted area is 1 and the non-weighted area is 0, with these WGT and NWGT values and so there is no skipping (non-weighting) of scan lines. For a 141 weighting, one and a half lines are processed, and then half a line is skipped. Thus, the weighted area will be 3 and the non-weighted area will be 1.

Another relevant equation determines how many lines to skip, and this determination is used in other calculations. A skip generator 59 calculates the value of SKIP which is governed by the equation:

$$SKIP = (NWGT/WGT) \quad (EQ2)$$

Once adder 56 performs the adding operation, the sum is evaluated by an overflow 57 to determine if the sum is greater than 1. If the sum is not greater than 1, then overflow 57 forwards a DTO value signal 60 to a DTO determiner 62. Alternatively, if the sum from adder 56 is greater than 1, then the whole number is stripped off as a carry bit or overflow which initiates a valid signal 64. The remainder from this overflow operation is forwarded by adder 56 as DTO value 60 to DTO determiner 62.

The above description outlines the process of determining the DTO weights generally, but in order to start this general process, a start value must be inserted into DTO determiner 62 from a start value generator 68. This initial stage is needed because of the special case circumstances surrounding the receipt of the first scan line of pixels (or the first pixel when considering the horizontal scaling operation), which do not have preceding lines (or pixels) to consider in the conversion process. The start value generator 68 is governed by rules which accommodate for these special situations. When considering the vertical scaling and flicker reducing operation, one such rule, which generates a first odd start value, is defined by:

$$FIRDTODDLINE = (INC/2) + 0.5 \quad (EQ\ 3)$$

This is also the value sent to DTO determiner 62 for generating the first pixel when horizontally scaling.

If the entire first odd field has been generated, and it is time to begin the first even field, another rule comes into play to generate the start value input into DTO determiner 62. This rule is defined by:

$$FIRSTEVENLINE = (INC - SKIP)/2 \quad (EQ\ 4)$$

Figure 5:
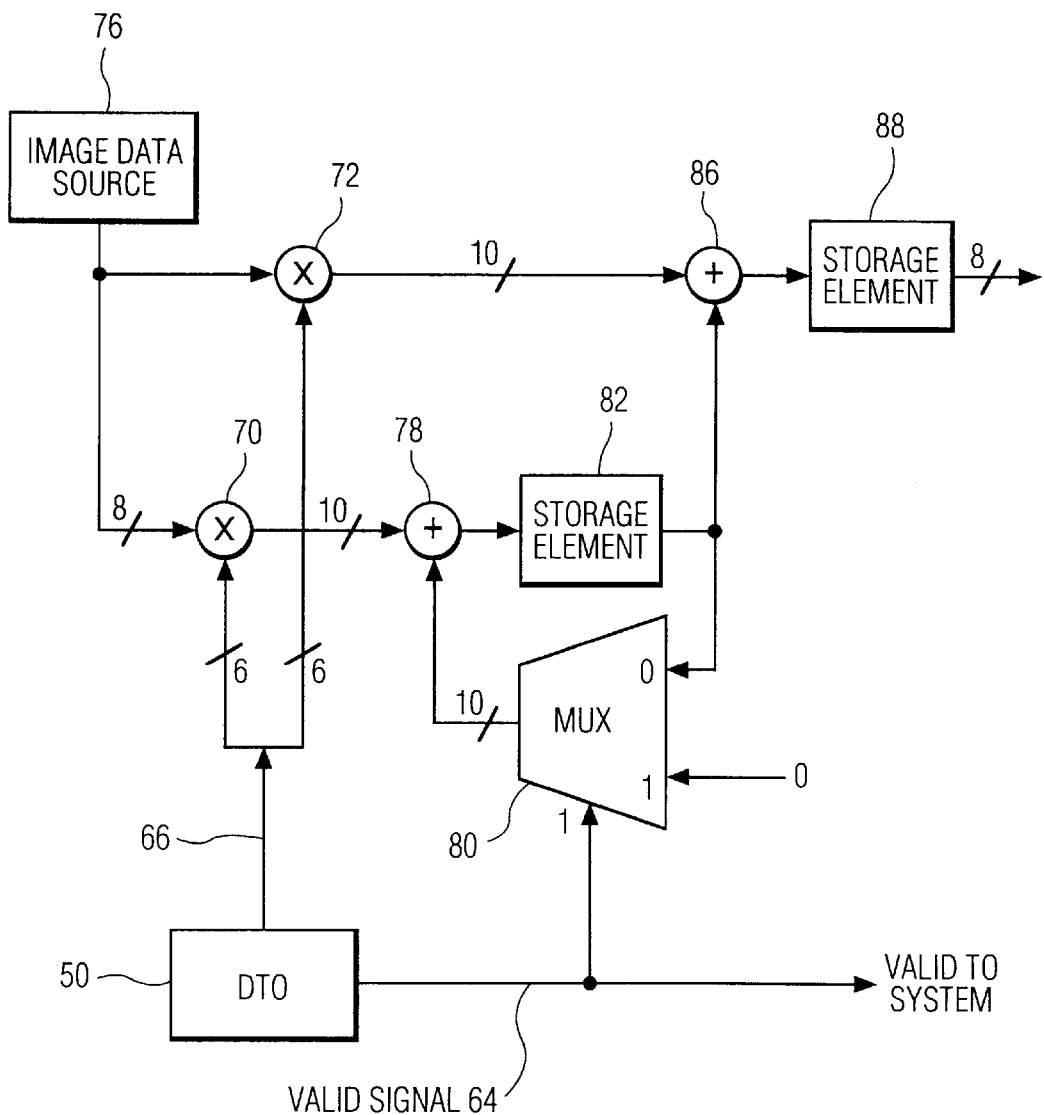
FIG. 5 is a block diagram of a converter constructed in accordance with an embodiment of the present invention.

Returning to the 121 weighing example, the start value generator 68 sends the first odd start value defined in EQ3. Since the total number of lines of a non-interlaced frame will be reduced by half to display the odd lines in the odd field, and the even lines in the even field, and since all the area is weighted, INC has a value of 0.5 and SKIP has a value of 0 according to equations 1 and 2. These values, and the values of other examples, are tabulated for convenience in FIG. 6. In order to provide a quick reference to the table in FIG. 6, a combination of a letter and a number appears next to a value to show which column and row, respectively the value appears on the table. Since INC is the same throughout the 121 weighting example, 0.5 appears in location C2. The value for SKIP is also the same throughout this example and this value is 0 which is shown C1. From EQ 3, FIRDTODDLINE has a value of 0.75 C3 throughout the 121 weighting example. This 0.75 value is sent from start value generator 68 to DTO determiner 62 which generates a DTO weight signal according to the following rules:

(RULE 1) If there is no carry bit generated by overflow 57, and if the line of pixel data being operated on is the first odd field line to be generated for the interlaced format, then multiplier 70 (FIG. 5) receives a DTO weight value equal to (INC÷2)+0.5.

(RULE 2) If there is no carry bit generated by overflow 57, and if the line of pixel data being operated on is the first even field line to be generated for the interlaced format, then multiplier 70 receives a DTO weight value equal to (INC−SKIP)÷2.

(RULE 3) If the current line being operated on is not the first scan line of the odd field or the first scan line of the even field and no overflow signal has been generated, then multiplier 70 is forwarded the DTO weight value equal to INC. Presumably, a multiplier 72 can receive the same value, but multiplier 72 is not triggered to perform a multiplication because no valid signal 64 has been sent.

(RULE 4) In the event that an overflow signal has been generated, DTO determiner 62 makes the following evaluations:

If DTO value 60–SKIP is positive, then DTO MUX 52=DTO value–SKIP, otherwise DTO MUX 52=DTO value 60. Additionally, upon receipt of the overflow signal, multiplier 70 is forwarded a DTO weight value=INC–DTO value 60, and multiplier 72 receives the DTO weight value= INC–DTO value 60.

The above rules and conditions dictate what value of DTO weight 66 is at any given time. Since the value of DTO weight 66 is frequently changing according to these rules and conditions, the weighting coefficients are considered dynamic. Unlike other anti-flicker and scaling algorithms that employ weighting coefficients to adjust pixel intensity, the present invention adjusts these weights dynamically using these rules and conditions.

Referring again to the 121 weighting example, since the initial conditions are the only values that have been established, no carry bit has been generated. Thus, DTO determiner 62 sends DTO weight 66 the value of 0.75. This value of 0.75 is forwarded to multiplier 70. (See FIG. 5 which depicts either the vertical scalar and anti-flicker component 14 and/or horizontal scalar 12.) The multiplier 70 multiplies each pixel of the first incoming scan line data coming from an image data source 76, such as the matrix downsampler 16 or the RAMDAC interface 30, by 0.75, and sends that result to adder 78. A MUX 80 passes the contents from a storage element 82, but since it is the first line being operated on in this example, there are no contents in storage element 82 at this time. Therefore, adder 78 adds the data that has come from image data source 76 to 0, and stores this value in storage element 82.

At the next clock cycle (column B of FIG. 6), the adder 56 of the DTO 50 adds INC to the contents of DTO storage element 54. (The contents of the DTO storage element 54 were established in the last clock cycle as the 0.75 sent from the DTO determiner 62.) Since INC in this 121 weighting example is consistently 0.5 C2, the sum generated by adder 56 is 1.25. The overflow 57 sends the carry bit of 1 B7 which initiates valid signal 64 and reduces the sum of adder 56 by one such that the DTO value 60 is 0.25 B6. The DTO determiner 62 outputs a DTO weight 66, in accordance with the rules and conditions outlined above. Specifically, the DTO weight 66 has a value equal to INC minus the DTO value 60 which in this case is 0.5 minus 0.25 which equals 0.25 B10–11. Since valid signal 64 has been sent, multipliers 70 and 72 both receive DTO weight 66.

The multiplier 72 multiplies 0.25 times the second scan line of input data, and sends that data to an adder 86. The adder 86 adds this scaled down data to the data previously stored in storage element 82 (which is 0.75 times the first scan line) so that the sum equals three quarters of the first line plus one quarter of the second line, which is then stored in output register 88 B14.

The multiplier 70 multiplies 0.25 B10 times the second scan line of input data sent from image data source 76. Since the valid signal 64 has been sent, the MUX 80 passes a zero to adder 78 to add to the result of multiplier 70. The sum from adder 78 is stored in line store 82.

The DTO 50 is able to increment once again so that line three (column C in FIG. 6) can be operated on. The contents of the DTO storage element 54 is 0.25 because on the last iteration, the DTO determiner 62 sent this value through the DTO MUX 52. The adder 58 adds INC which is 0.5 such that the sum is 0.75. Since this is less than one, no carry bit is generated and 0.75 is forwarded as the DTO value 60 to the DTO determiner 62. This 0.75 value is also sent through the DTO MUX 52 for the fourth clock cycle. During this clock cycle, the DTO determiner 62 generates DTO weight 66 equal to 0.5 according to the rules and conditions. Specifically, there was no carry bit generated, so DTO weight value 66 equals INC which is always 0.5 in this 121 weighting example. This 0.5 DTO weight value 66 is sent to the multiplier 70 which multiplies the third incoming scan line by 0.5. The product is added to the previous contents of storage element 82 because the contents of the storage element 82 were passed by MUX 80 since no valid signal 64 was sent to MUX 80. Thus, storage element 82 now has 0.25 times scan line 2 plus 0.5 times scan line 3, and the next iteration is ready to begin.

Adder 56 adds the 0.75 D8 from the DTO storage element 54 with 0.5 D2 from increment generator 58, the sum being 1.25. Thus, carry bit D7 is generated and the DTO value 60 equals 0.25 D6. According to the rules, the DTO determiner 62 generates a DTO weight 66 equal to 0.25 D10–11 which is sent to both multipliers 72 and 70. Scan line four is multiplied in multiplier 72 by 0.25 and added to the contents of storage element 82 in adder 86 such that the register 88 receives total 0.25 times line two plus 0.5 time line three plus 0.25 times line four. The multiplier 70 multiplies 0.25 times line four so that adder 78 can add zero to this value which is then stored in storage element 82. Zero is added because MUX 80 received the valid signal 64 that is generated when the carry bit is generated.

Iteration five begins as the preceding iterations. The result is shown in column E and after a sixth iteration, a scan line is produced that is represented in F14 as 0.25 time line four plus 0.5 times line 5 plus 0.25 times line 6. These iterations are continued until all of the odd number lines in frame 5 are converted. Then the same type of process begins again, taking into account the initial FIRSTEVENLINE equation 4. However, subsequent processing is achieved according to the steps outlined above.

Other examples are provided in the table shown in FIG. 6 for different weightings such as for 141 and 161 weighting. It should be noted that different weightings, such as 141 or 161, provide for more emphasis given to the scan line under consideration (that is not a special case). That is to say when line three is being calculated in 141 weighting, more weight is given to the original line three input from frame 5 as is seen in D28 in FIG. 6. This is represented by the numeral "4" in the 141 designation, whereas only a weight of "1" is associated with the scan line above and below scan line 3. As shown in FIG. 6, ⅔ D28 is multiplied by scan line three as opposed to only ½ in the 121 example discussed above D14. Since more weight is given to line three, less weight is afforded to scan lines two and four as shown by the ⅙ coefficient located before "p2" and "p4" D28.

In any of these examples, different weightings can be generated based on the equations and rules discussed above. As a result, the coefficients can be dynamically adjusted by specifying the ratio of output lines to input lines (INC), by specifying a SKIP value, by reducing the INC ratio to achieve more vertical scaling, or increasing the INC ratio to achieve less vertical scaling. For example, in a 0.82.8 weighting, more vertical scaling is achieved than in the 121 example discussed above. Following the method described above yields DTO values 60 equal to 0.4, 0.8, 0.2 (with a carry), 0.6 and 0 (with a carry) for the first five scan lines considered. This in turn generates STO weights equal to 0.4, 0.4, 0.2, 0.4, and 0.4 respectively for these first five pixels. This example indicates well the dynamic nature of the weighting coefficients (DTO weights) since these weights change more dynamically than the previous examples. However, this is an extreme example since the resultant vertical scaling combines the first three scan lines into one scan line for display in interlaced format, and then only two scan lines into one for display in interlaced format. The effect is a ⅖ vertical scaling which is usually more than most viewers of the final interlaced display desire. Accordingly, the values for 121, 141, and 161 were expressly set forth in FIG. 6 since these are much more common modes of operation. Of course, no integration of lines above or below a particular line of interest can be achieved, but commonly preferred values of integration utilize up to approximately one quarter of both a line above, and a line below. Some of the more preferred values of line integration are within the range of one half to one eight, with one quarter typically being the most preferred. These same principles hold true when horizontal scaling is being accomplished using adjacent pixels. More than three line (or pixel) integration can be achieved using the techniques described above, as would be obvious to those of ordinary skill in the art.

As mentioned above, the same discrete time oscillator (DTO) is applied to achieve horizontal scaling as well. Horizontal scaling is necessary when converting a computer generated graphic, which was produced for display on a non-interlaced monitor, to an interlaced format. Depending on the interlaced monitor, horizontal scaling is dynamically alterable as well using the dynamic coefficients produced by a separate DTO used for horizontal scaling in horizontal scalar 12.

Although the present invention has been described in terms of specific exemplary embodiments, it will be understood by those skilled in the art that variations and modifications can be effected in these exemplary embodiments without departing from the scope and spirit of the invention.

What is claimed is:

1. An image conversion device for use in converting non-interlaced visual display data into interlaced visual display data for display on an interlaced monitor, said device comprising:

a discrete time oscillator (DTO) that produces dynamic weighting coefficients which adjust input pixel values received in a non-interlaced format to an interlaced format;

a multiplier that multiplies the input pixel values by the dynamic weighting coefficients to produce altered pixel values; and an adder that adds the altered pixel values together to form output pixel values for display in the interlaced format.

2. An image conversion device as claimed in claim 1 wherein the DTO comprises a DTO determiner that produces a rewritten value, an increment generator that generates an increment value, and a DTO adder that adds the increment value to the rewritten value to produce a first sum value, and wherein the DTO determiner produces the dynamic weighting coefficients based on the first sum value.

3. An image conversion device as claimed in claim 2 further comprising an overflow determiner that determines whether the sum value generated by the DTO adder is less than 1 when normalized, and if so forwarding the first sum value to the DTO determiner.

4. An image conversion device as claimed in claim 3 wherein the DTO determiner includes means for producing a dynamic weighting coefficient equal to the increment value upon receiving the first sum value from said overflow determiner.

5. An image conversion device as claimed in claim 4 wherein the overflow determiner further comprises a valid signal generator that generates a valid signal if the first sum value is greater than or equal to 1, and sends a portion of the first sum value to the DTO determiner, wherein the portion is that portion of the first sum value less than 1.

6. An image conversion device as claimed in claim 5 wherein the DTO further comprises a skip generator that generates a skip value provided to the DTO determiner, and the DTO determiner includes means for making said rewritten value equal to a new rewritten value, defined by the portion of the first sum less than 1 minus the skip value, when the new rewritten value is positive, and wherein the DTO determiner produces a dynamic weighting coefficient equal to the increment value minus the portion of the first sum value less than 1.

7. An image conversion device as claimed in claim 6 wherein the DTO further comprises a DTO determiner that determines a dynamic weighting coefficient equal to the increment value minus the portion of the first sum value less than 1.

8. An image conversion device as claimed in claim 1 wherein the input pixel values comprise individual pixel data of pixels horizontally adjacent to at least one other pixel and the image conversion device includes a horizontal scalar device that horizontally scales said horizontally adjacent pixel values.

9. An image conversion device as claimed in claim 1 wherein the input pixel values comprise scan lines having a plurality of individual pixels, wherein one of the individual pixels of the scan line is vertically adjacent to at least one other individual pixel of another scan line, and the image conversion device includes an anti-flicker and vertical scalar device that vertically scales the vertically adjacent pixels.

10. An image conversion device as claimed in claim 1 wherein the input pixel values comprise scan lines having a plurality of individual pixels, wherein one of the individual pixels of the scan line is vertically adjacent to at least one other individual pixel of another scan line, and the image conversion device includes an anti-flicker and vertical scalar device that vertically scales the vertically adjacent pixels.

11. An image conversion device as claimed in claim 10 wherein the DTO is in both of a horizontal scalar device and the anti-flicker and vertical scalar device.

12. An image conversion method for converting non-interlaced visual display data into interlaced visual display data for display on an interlaced monitor, said method comprising:

dynamically producing weighting coefficients which adjust input pixel values received in non-interlaced form to an interlaced form;

multiplying said input pixel values by said dynamic weighting coefficients to produce altered pixel values;

adding said altered pixel values together to form output pixel values; and displaying said output pixel values.

13. An image conversion method as claimed in claim 11 wherein said input pixel values comprise individual pixel data of pixels horizontally adjacent to at least one other pixel and said image conversion method further comprises horizontally scaling said horizontally adjacent pixel values.

14. An image conversion method as claimed in claim 12 wherein said input pixel values comprise individual rows of individual pixel data of pixel rows vertically adjacent to at least one other pixel row and said image conversion method further comprises vertically scaling said vertically adjacent pixel rows and simultaneously reducing flicker effects.

15. An image conversion method as claimed in claim 11 which further includes a first pixel value generator generates a first odd dynamic weighting coefficient for use in producing a first odd field pixel value.

16. A video and graphics controller for converting from non-interlaced pixel data to interlaced pixel data for display on an interlaced monitor, said video and graphics controller comprising;

a horizontal scalar that performs a horizontal scaling operation on said non-interlaced pixel data; and a vertical scalar that performs a vertical scaling operation and reduces flicker effects on said non-interlaced pixel data;

wherein each of said scalars includes a dynamic coefficient generator that dynamically varies weighting values applied to said pixel data in each of said scaling operations in order to convert from the non-interlaced pixel data to the interlaced pixel data.

* * * * *